United States Patent
Lydon et al.

(10) Patent No.: US 6,381,270 B1
(45) Date of Patent: Apr. 30, 2002

(54) CABLE EQUALIZER FOR AES DIGITAL AUDIO DATA

(75) Inventors: Donald S. Lydon, Grass Valley; Charles S. Meyer, Nevada City, both of CA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/227,025

(22) Filed: Jan. 7, 1999

(51) Int. Cl.[7] .............................. H03H 7/30; H03H 5/00
(52) U.S. Cl. ...................... 375/230; 333/28 R
(58) Field of Search .................... 375/230, 229, 375/350, 257; 333/18, 28 R; 708/300, 322, 323

(56) References Cited

U.S. PATENT DOCUMENTS 6,044,112 A * 3/2000 Koslov ........................ 375/235
6,061,393 A * 5/2000 Tsui et al. ................... 375/224
6,141,378 A * 10/2000 d'Oreye de Lantremange .. 375/232

\* cited by examiner

Primary Examiner—Chi Pham
Assistant Examiner—Khai Tran
(74) Attorney, Agent, or Firm—Merchant & Gould P.C.

(57) ABSTRACT

An electrical signal is equalized at the receiving end of a transmission path by applying the signal both to a frequency-dependent emphasizer and to a first port of a mixer and applying the output signal of the frequency-dependent emphasizer to a second port of the mixer. The mixer combines the signals received at its first and second ports in accordance with the amplitude of a mixer control signal to generate a mixer output signal. A control signal is generated from the mixer output signal. The control signal has an amplitude dependent on the absolute value of the derivative of the amplitude of the output signal of the mixer during an interval that starts after the beginning of a bit cell and ends before the end of the bit cell. The control signal is applied to the mixer as the mixer control signal.

3 Claims, 7 Drawing Sheets

CABLE EQUALIZER FOR AES DIGITAL AUDIO DATA

BACKGROUND OF THE INVENTION

This invention relates to a cable equalizer for AES digital audio data.

When an electrical signal is transmitted over a cable from a transmitting end to a receiving end, frequency-dependent attenuation may cause the waveform of the signal at the receiving end of the cable to be significantly different from the waveform of the signal at the transmitting end. It is known to compensate for this frequency-dependent attenuation by equalizing the signal at the receiving end.

A typical form of automatic cable equalizer for equalizing a signal $V_{in}$ at the receiving end of a cable 8 is shown schematically in FIG. 1. The equalizer includes an amplifier 10 having a transfer function H(s) and a mixer 14 which receives both the signal $V_{in}$ and the output of the amplifier 10 and provides an output signal $V_{out}$. The transfer function H(s) is the mathematical inverse of the transfer function of a fixed length of the same cable material as is used in the cable 8. Accordingly, the amplifier 10 behaves as a high-frequency emphasis circuit which compensates for the loss of a fixed length of cable. The value of the mix coefficient α depends on the actual length of cable between the transmitter and the equalizer and is derived from the output signal $V_{out}$ of the equalizer, by comparing a voltage parameter of the output signal $V_{out}$ with a reference value $V_{ref}$ and adjusting α in order to minimize the difference between the values.

A more basic type of cable equalizer is shown schematically in FIG. 9. Referring to FIG. 9, $$V_{out} = \alpha V_{in} + (1+\alpha)H(s)V_{in} \quad (1)$$

$$H(s) = (1 + R_f/Z_c)$$

Substituting for H(s) in equation 1, $$V_{out} = V_{in} + V_{in}(R_f/Z_c(1-\alpha)) \quad (2)$$

Equation 2 is of the form $$V_{out} = K1 V_{in} + K2(1-\alpha)V_{in} \quad (3)$$

where K1 and K2 are constants.

The equalizer shown in FIG. 9 is used in stages, depending on the cable length. A given equalizer might be designed to correct for frequency-dependent attenuation by 500 feet of cable, and if the cable length were 1000 feet, two equalizers of this design would be used. The mix coefficient enters the equation describing the operation of the equalizer shown in FIG. 9 through the number of stages of equalization that are employed.

Referring again to FIG. 1, if the peak amplitude of the transmitted signal is known, the mix coefficient can be derived by employing a peak detector 18 to measure the peak amplitude at the output of the equalizer and a differential amplifier 20 to subtract the measured value of the peak amplitude from the known value of the transmitted signal's peak amplitude.

Standards promulgated for video equipment establish the peak voltage level of the video signal as either 1 V or 800 mv. It is straightforward to measure the peak amplitude of the received signal during the equalizing pulses and employ this measured peak value to control an equalizer having the topology shown in FIG. 1.

One form of NRZ digital data coding is known as bi-phase mark coding. In bi-phase mark coding, a signal epoch is divided into bit cells of duration τ by a clock, and each source data bit is represented by a 2-cell doublet. Each coding doublet begins, and therefore also ends, with a transition. A source data bit 1 generates a transition between the two cells of the doublet, whereas a source data bit zero does not. Thus, a source data bit zero is represented either by the doublet 00 or the doublet 11, while a source data bit one is represented either by the doublet 10 or the doublet 01.

The Audio Engineering Society/European Broadcasting Union data stream for digital audio data employs a bi-phase mark coded signal in which each audio sample is represented by a subframe containing 32 doublets. The first 4 doublets of the subframe constitute a preamble containing at least one occurrence of the 3-cell sequence 000 or 111, which violates the bi-phase mark coding. FIG. 2 shows by way of example one form of preamble followed by a sequence of source data bits 11001.

When the AES digital audio signal is transmitted over a lengthy cable, the reactive impedance of the cable may cause distortion of the signal so that the waveform of the signal at the receiving end of the cable is significantly different from the waveform of the signal at the transmitting end. Referring to FIG. 3, the signal represented by waveform A at the transmitting end may have the waveform B at the receiving end of the cable. In order to recover the audio data with a high degree of reliability, it is necessary to compensate for the frequency-dependent attenuation of the signal by equalizing the signal at the receiving end.

The standard that prescribes the format of the AES digital audio signal does not specify one or two discrete values of the signal amplitude but merely specifies that the amplitude of the signal at the receiving end of the cable must be in the range from 100 mV p-p to 10 V p-p. This wide range of amplitudes does not allow an equalizer having the topology shown in FIG. 1 to derive the mix coefficient a with a sufficient degree of precision simply on the basis of the amplitude of the output signal of the equalizer.

SUMMARY OF THE INVENTION

In accordance with the invention there is provided a method of equalizing an electrical signal that is propagated over a path from a transmitting end of the path, at which a signal composed of pulses of uniform amplitude within a bit cell is impressed on the path, to a receiving end of the path, said method comprising applying the signal at the receiving end of the transmitting path both to a frequency-dependent emphasizer and to a first port of a mixer, applying the output signal of the frequency-dependent emphasizer to a second port of the mixer, employing the mixer to combine the signals received at its first and second ports in accordance with the amplitude of a mixer control signal to generate a mixer output signal, generating a control signal from the mixer output signal, the control signal having an amplitude dependent on the absolute value of the derivative of the amplitude of the output signal of the mixer during an interval that starts after the beginning of a bit cell and ends before the end of the bit cell, and applying the control signal to the mixer as the mixer control signal.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
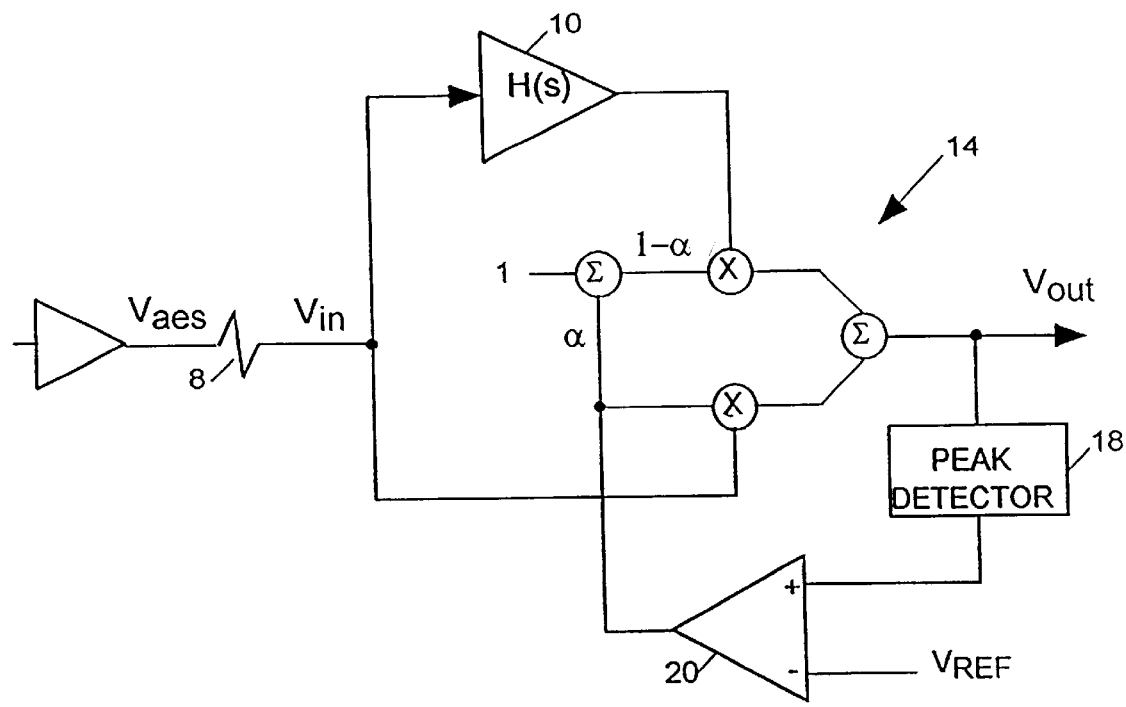
FIG. 1 is a block diagram of a conventional automatic cable equalizer.
Figure 2:
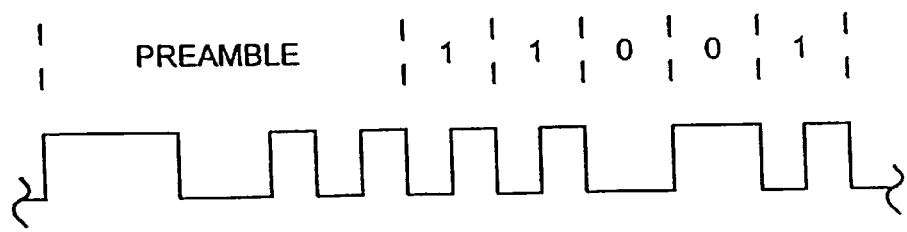
FIG. 2 is a graph showing the waveform of an AES signal during a brief interval.
Figure 4:
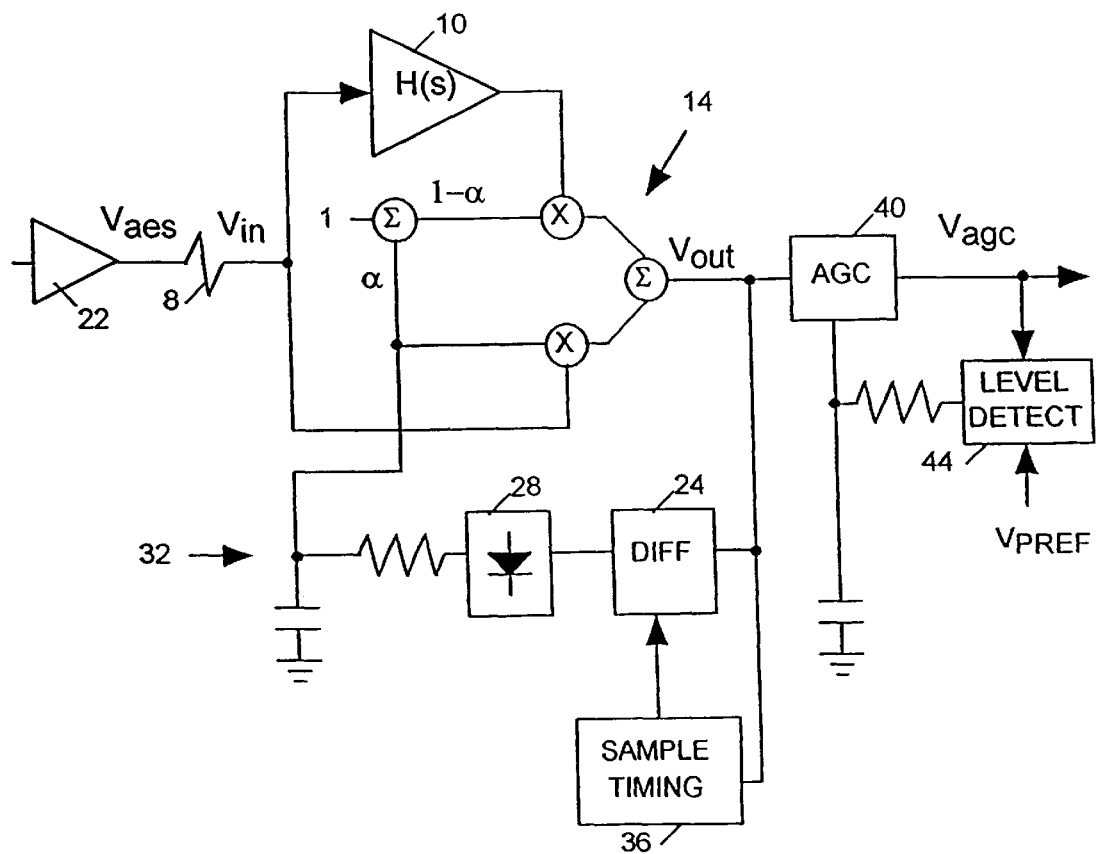
FIG. 4 is a simplified block diagram of an equalizer in accordance with the present invention, FIGS. 5A and 5B, collectively referred to as FIG. 5, show implementation of a part of the equalizer shown in FIG. 4.

Referring to FIG. 4, a transmitter 22 impresses an AES signal on the transmitting end of the cable 8. The receiving end of the cable is connected to an equalizer amplifier 10 having its output connected to a mixer 14, just as in the case of FIG. 1. The mix coefficient α of the mixer is derived by a feedback loop which includes a differentiator 24 and a rectifier 28. The differentiator 24 samples the level of the output signal of the mixer at times T1 and T2 and provides a signal ΔV representative of the difference between the voltage levels of the signal at the times T1 and T2. The rectifier 28 provides a signal ΔV+ representative of the absolute value of the difference between the voltage levels of the signal $V_{out}$ at the times T1 and T2 and applies it to the mixer 14 through a loop filter 32. A sample timer 36 selects the times T1 and T2 relative to the bit cell boundaries so that the sample times lie within the same bit cell and should therefore be nominally equal in value. Operation of the feedback loop tends to force the difference signal ΔV+ to zero, resulting in a value of α such that the signal $V_{in}$ is properly equalized.

In accordance with standards governing the AES digital data signal, the output driver of the equalizer must provide a signal having an amplitude in the range 1 V p-p to 10 V p-p. Since the output signal $V_{out}$ of the equalizer might have an amplitude as small as 100 mv p-p, the output signal of the equalizer is supplied to an automatic gain control amplifier 40 which provides an output signal $V_{agc}$. A level detector 44 compares the peak-to-peak amplitude of the signal $V_{agc}$ with a selected reference value $V_{pref}$ in the range 1 V to 10 V, and supplies an output signal which controls the gain of the automatic gain control amplifier 40 so that the peak-to-peak amplitude of the signal $V_{agc}$ is forced to be equal to $V_{pref}$.

Figure 3:
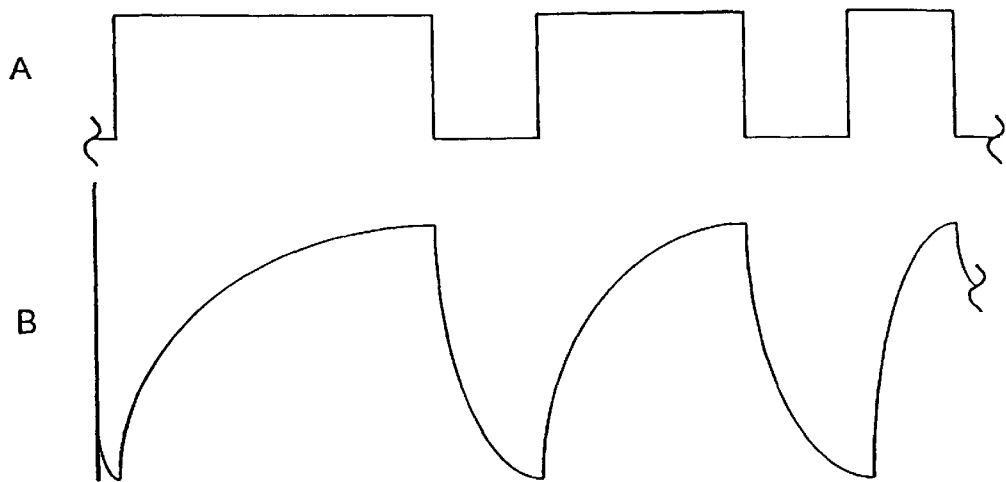
FIG. 3 is a graph showing the waveform of an AES signal before (A) and after (B) transmission through a cable that exhibits frequency-dependent attenuation.
Figure 5A:
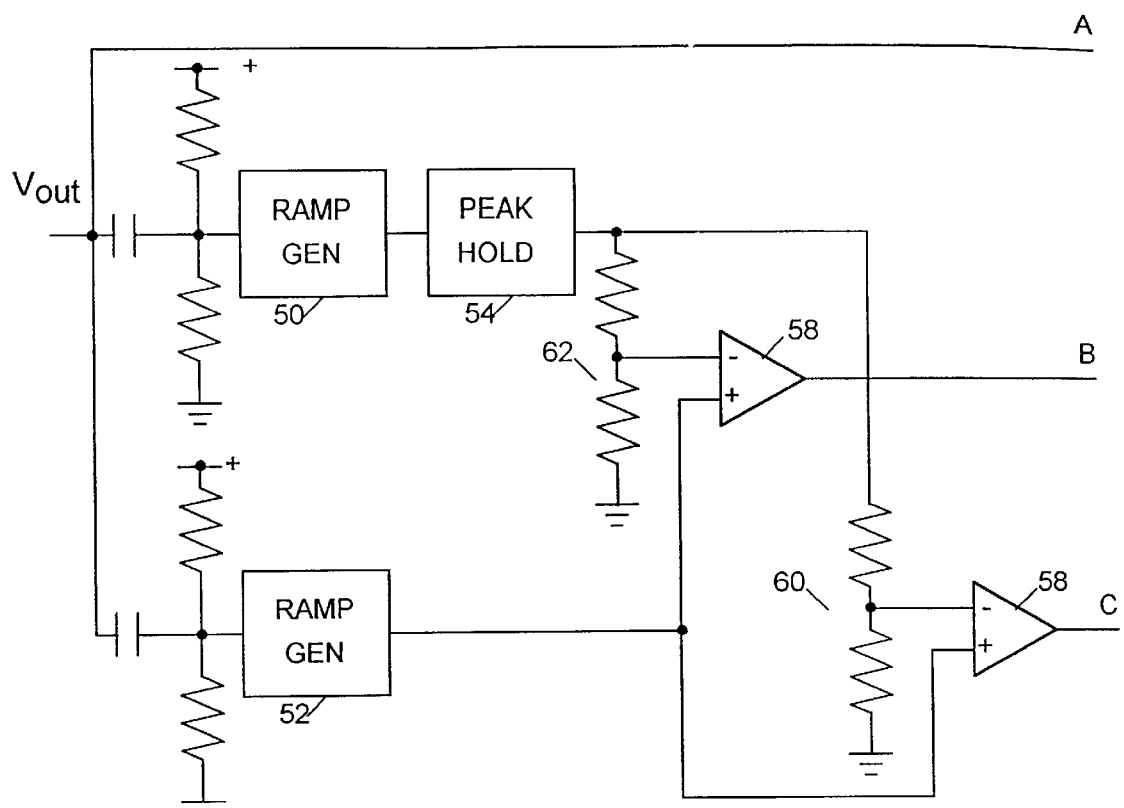
Figure 5B:
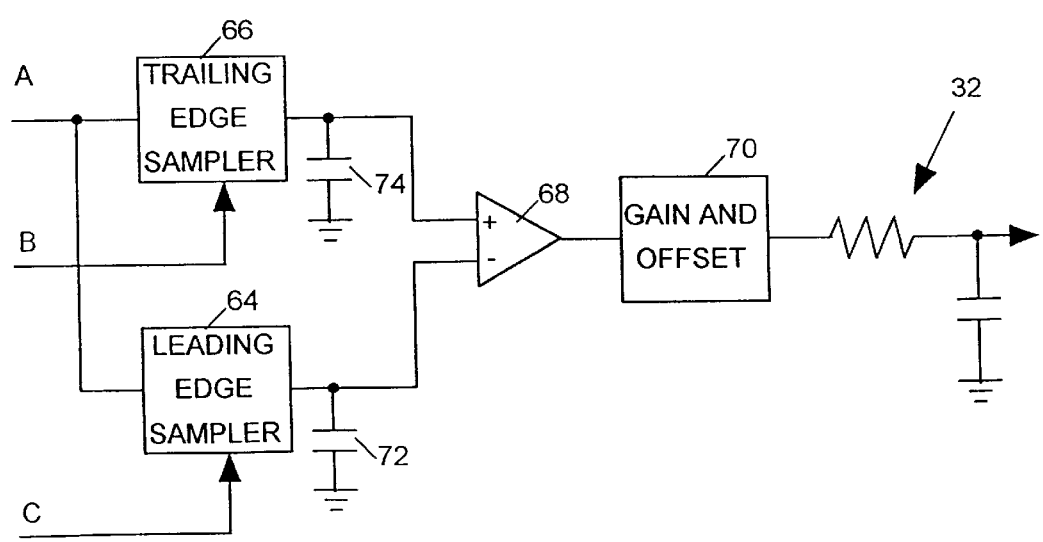

FIG. 5 illustrates a circuit for implementing the functions of the differentiator 24, rectifier 28 and sample timer 36 shown in FIG. 4. The circuit shown in FIG. 5 exploits the fact that the slope of the waveform of the received signal $V_{in}$, as shown by waveform B in FIG. 3, changes polarity at each edge of the waveform of the transmitted signal. Thus, the waveform of the received signal is positive or zero during a positive pulse of the transmitted signal and is negative or zero during a negative pulse of the transmitted signal, regardless of whether the pulse is one, two or three bit cells in length. Assuming that the signal $V_{out}$ is not equalized, the signal $V_{out}$ has a similar waveform to the signal $V_{in}$.

As shown in FIG. 5, the signal $V_{out}$ is supplied to ramp generators 50 and 52 through respective dc blocking capacitors and level shifters. Due to the action of the dc blocking capacitors and level shifters, the input signals to the ramp generators 50 and 52 are positive during a positive pulse of the transmitted signal $V_{aes}$. Each ramp generator generates a linear ramp signal having a slope m v/s while its input signal is positive. If the positive pulse of the signal $V_{aes}$ is one bit cell in duration, the peak output voltage of the ramp generator 50 is mτ, whereas if the positive pulse is two bit cells in duration, the peak voltage of the ramp is 2mτ and if the positive pulse is three bit cells in duration, the peak voltage is 3mτ. The output signal of the ramp generator 50 is applied to a peak hold circuit 54 which provides an output voltage corresponding to the maximum voltage attained by the ramp generator 50. Consequently, in steady state conditions, the output voltage of the peak hold circuit is 3mτ.

The output voltage of the peak hold circuit is applied through two potential dividers 60 and 62 as leading and trailing edge reference voltages to the inverting inputs of respective comparators 56 and 58. The potential divider 60 divides the output voltage of the peak hold circuit 54 by a factor of 12 and the potential divider 62 divides the output voltage by a factor of 4. The leading and trailing edge reference voltages are therefore mτ/4 and 3mτ/4. The exact values of the leading and trailing edge reference voltages are not critical. It is necessary only that the leading edge reference voltage be greater than zero and less than mτ and that the trailing edge reference voltage be significantly greater than the leading edge reference voltage and be less that mτ.

The ramp generator 52 performs in similar fashion to the ramp generator 50 and generates a ramp signal having a slope m v/s during each positive pulse of the signal $V_{aes}$. The output signal of the ramp generator 52 is applied to the non-inverting inputs of the comparators 56 and 58. Thus, during a positive pulse of the signal $V_{aes}$, the output signal of the comparator 58 goes high about τ/4 after the beginning of the pulse and goes low at the end of the pulse, whereas the output signal of the comparator 56 goes high about 3τ/4 after the beginning of the pulse and goes low at the end of the pulse.

The output signal $V_{out}$ is also applied to a leading edge sampler 64 and a trailing edge sampler 66, the outputs of which are connected to the inverting and non-inverting inputs respectively of a differential amplifier 68. The leading edge sampler is controlled by the output of the comparator 56 and the trailing edge sampler is controlled by the output of the comparator 58. Thus, during a rising edge of the signal $V_{out}$ corresponding to a positive pulse of the signal $V_{aes}$, the signal $V_{out}$ is sampled by the leading edge sampler τ/4 after the beginning of the pulse and is sampled by the trailing edge sampler 66 3τ/4 after the beginning of the pulse. Since the shortest pulse is one bit cell in duration, both samples are taken within the same bit cell. The capacitor 72 is accordingly charged to the voltage of the signal $V_{out}$ at time τ/4 after the beginning of each positive pulse of the signal $V_{aes}$ and the capacitor 74 is charged to the voltage of the signal $V_{out}$ at time 3τ/4 after the beginning of each positive pulse of the signal $V_{aes}$. The differential amplifier 68 subtracts the leading edge sample from the trailing edge sample. The output signal of the differential amplifier 68 is brought to the proper range by a gain and offset circuit 70 and is applied to the loop filter 32.

In the case of the circuit shown in FIG. 5, the sample timing is accomplished by the components 50–62. Differentiation is accomplished by the leading edge sampler 64 and the trailing edge sampler 68 and the differential amplifier 68. Since the ramp generator 52 is responsive only to positive pulses of the signal $V_{aes}$, in which the slope of the signal $V_{out}$ is positive, so that the trailing edge sample must be larger than the leading edge sample, rectification is implicit in operation of the ramp generator 52 and the differential amplifier 68, which subtracts the smaller sample from the larger sample and therefore necessarily provides as its output the absolute value of the difference between the trailing edge sample and the leading edge sample.

Figure 6:
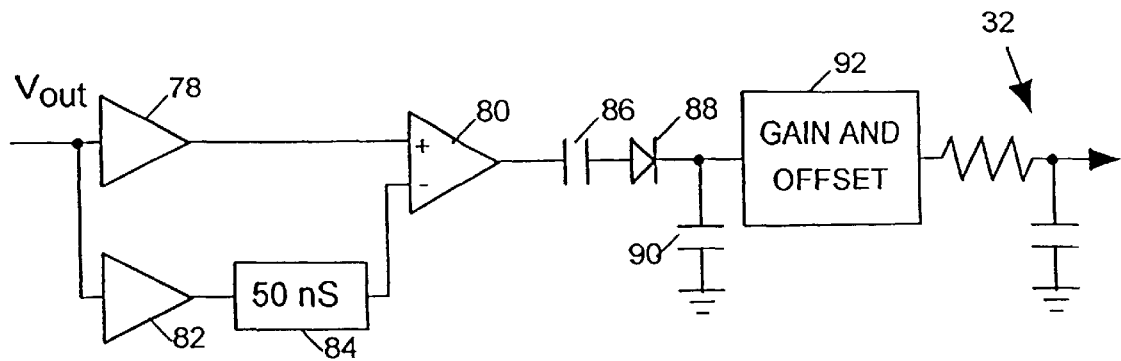
FIG. 6 is a block diagram of a second implementation of the part of the equalizer shown in FIG. 4.
Figure 9:
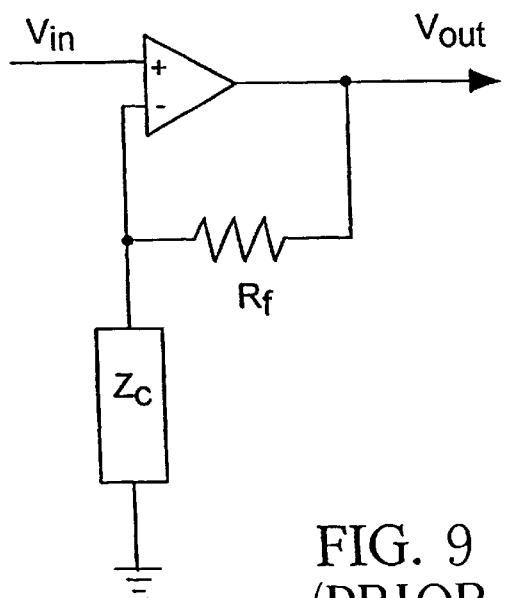
FIG. 9 is more schematic representation of another conventional type of cable equalizer.

Another circuit for implementing the functions of the differentiator 24, rectifier 38 and sample timer 36 is shown in FIG. 6. The signal $V_{out}$ is applied through a buffer 78 to the inverting input of a differential amplifier 80 and is applied through a buffer 82 and a delay line 84 to the non-inverting input of the amplifier 80. The delay imposed by the delay line 84 is selected so that it is less than the duration of one bit cell even at the highest frequency of the AES audio data signal and may, for example, be 50 ns. The output signal of the differential amplifier 80 is applied through an AC coupling capacitor 86 and a diode 88 to a storage capacitor 90.

The diode 88 half-wave rectifies the AC-coupled signal provided by the capacitor 86 and prevents discharge of the capacitor 90.

The storage capacitor 90 is charged when the output voltage of the differential amplifier 80 is positive, i.e. the voltage of the signal received at the non-inverting input of the amplifier 80 exceeds the voltage of the delayed signal received at the inverting input of the amplifier 80, the time for which the 50 ns interval spans a bit cell boundary is very much smaller than the time for which the 50 ns interval does not span a bit cell boundary, and the capacitor 90 is sufficiently large, that very little of the charge stored in the capacitor 90 is attributable to times at which the 50 ns interval spans a bit cell boundary. Accordingly, the voltage to which the capacitor 90 is charged depends substantially entirely on the average slope of the waveform of the signal $V_{out}$ during a positive pulse of the signal $V_{aes}$. The voltage to which the capacitor 90 is charged is applied to the loop filter 32 through a gain and offset circuit 92 which brings the voltage to the proper range.

In the case of the circuit shown in FIG. 6, differentiation is accomplished by the components 78–84 and rectification is accomplished by the diode 88.

Figure 7:
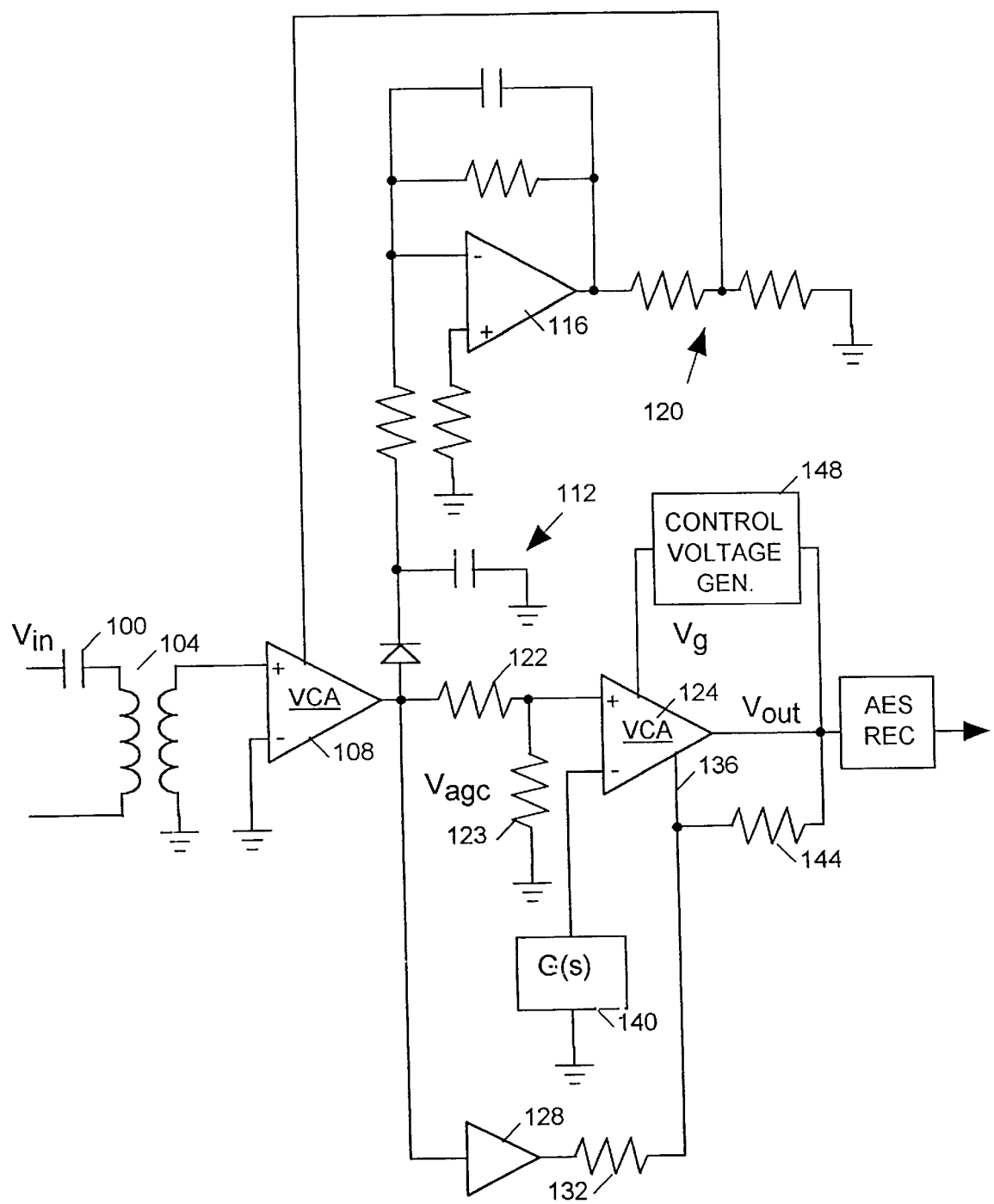
FIG. 7 is a more detailed block diagram of a preferred form of the equalizer shown in FIG. 4, and FIGS. 8A and 8B, collectively referred to as FIG. 8, show a block diagram of a part of the equalizer shown in FIG. 7.

FIG. 7 illustrates in greater detail a practical implementation of the invention.

Referring now to FIG. 7, an AES input signal $V_{in}$ at the receiving end of a cable (not shown) is applied through an AC coupling capacitor 100 to the primary winding of a transformer 104 which divides the amplitude of the input signal by a factor of 5. Thus, if the AES input signal has the maximum prescribed amplitude of 10 volts p-p, the maximum amplitude of the signal provided by the transformer 104 is 2 volts p-p. The transformer output signal is applied to an automatic gain control circuit, which includes a voltage controlled transimpedance amplifier 108. The output signal of the voltage controlled amplifier 108 is applied to a diode peak detector 112 which detects the peak amplitude of the output signal of the voltage controlled amplifier 108. The detected peak voltage is supplied to the inverting input of an amplifier 116 whose non-inverting input is grounded. The peak detector voltage is integrated at the output of the amplifier 116. A potential divider 120 which is connected between the output of the amplifier 116 and ground generates a control voltage which is applied to the voltage controlled amplifier 108. The gain of the voltage controlled amplifier is thereby controlled so that the integrated peak voltage output of the amplifier is held constant. In this manner, the peak-to-peak amplitude of the output signal of the amplifier 108 is set to a desired value, which is typically 2 volts.

The voltage output signal $V_{agc}$ generated by the voltage controlled amplifier 108 is gain scaled by resistors 122 and 123 and is applied to the non-inverting input of a second voltage controlled transimpedance amplifier 124. The amplifier 124 is preferably the Comlinear CLC5523 amplifier sold by National Semiconductor Corporation. The inverting input of the amplifier 124 is connected through an RC network 140 to ground. The RC network 140 is designed so that its transfer function G(s) is the inverse of the transfer function of a fixed length of cable.

The output signal of the amplifier 108 is also applied to an inverter 128 which also generates a voltage signal. The voltage signal generated by the inverter 128 is converted to a current signal by a resistor 132 and the current signal is supplied to a node 136 which is connected to a control current input of the amplifier 124. The output of the amplifier 124 is connected through a resistor 144 to the node 136. The output is also connected to a control voltage generator 148 which generates a control voltage signal $V_g$ which is applied to a control voltage input of the amplifier 124. The voltage $V_g$ supplied by the control voltage generator 148 corresponds to 1-α.

The voltage at the non-inverting input of the amplifier 124 dropped over the impedance Z of the network 140 generates a current which is buffered and is available at the pin connected to the node 136, depending on the mix coefficient α. Part of the current, depending on the voltage $V_g$, generates a voltage signal at the output of the amplifier 124. The output voltage $V_{out}$ of the amplifier 124 is converted to current by the resistor 144 and is combined with the current supplied by the amplifier 128 through the resistor 132 at the node 136. This current is supplied to the control current input of the amplifier 124. When the control current increases, the output voltage of the amplifier decreases and vice versa. It can be shown that $$V_{Out} = -V^+ \frac{R144}{Z_c} V_g - V^+ \frac{R144}{R132} \qquad (4)$$

Where $V^+$ is the voltage at the non-inverting input of the amplifier 124, and is thus proportional to $V_{agc}$, and $Z_c$ is the impedance of the network 140. R144 and R132 are ideally equal, but in a practical implementation they may be scaled.

Noting that $V_g$ corresponds to 1-α, is can be seen that $$V_{out} = K1 V^+ + K2(1-\alpha) V^+$$

which is the same form as equation (3).

The output signal of the amplifier 124 is supplied to a conventional AES receiver, which extracts the clock and recovers the source bits.

Figure 8A:
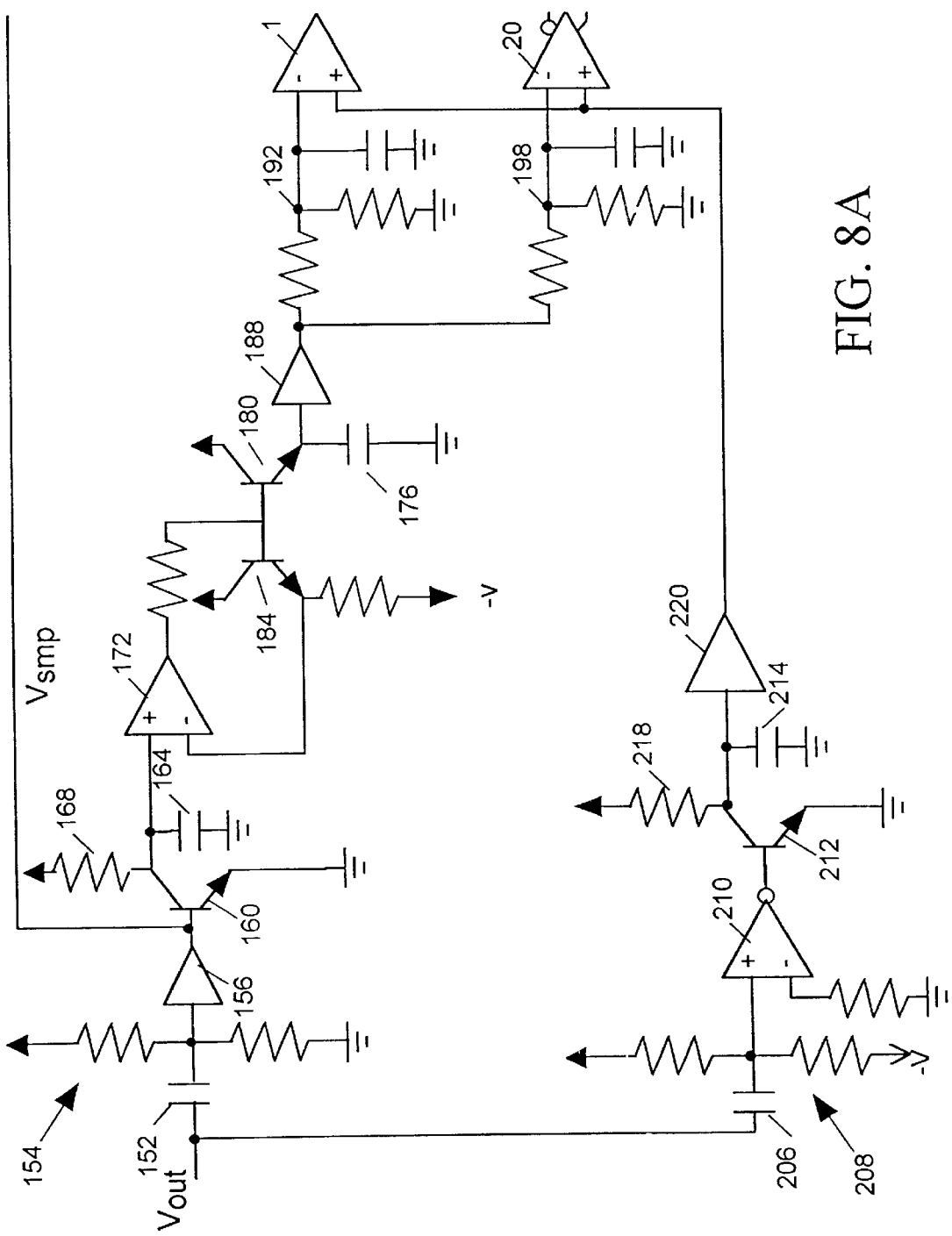
Figure 8B:
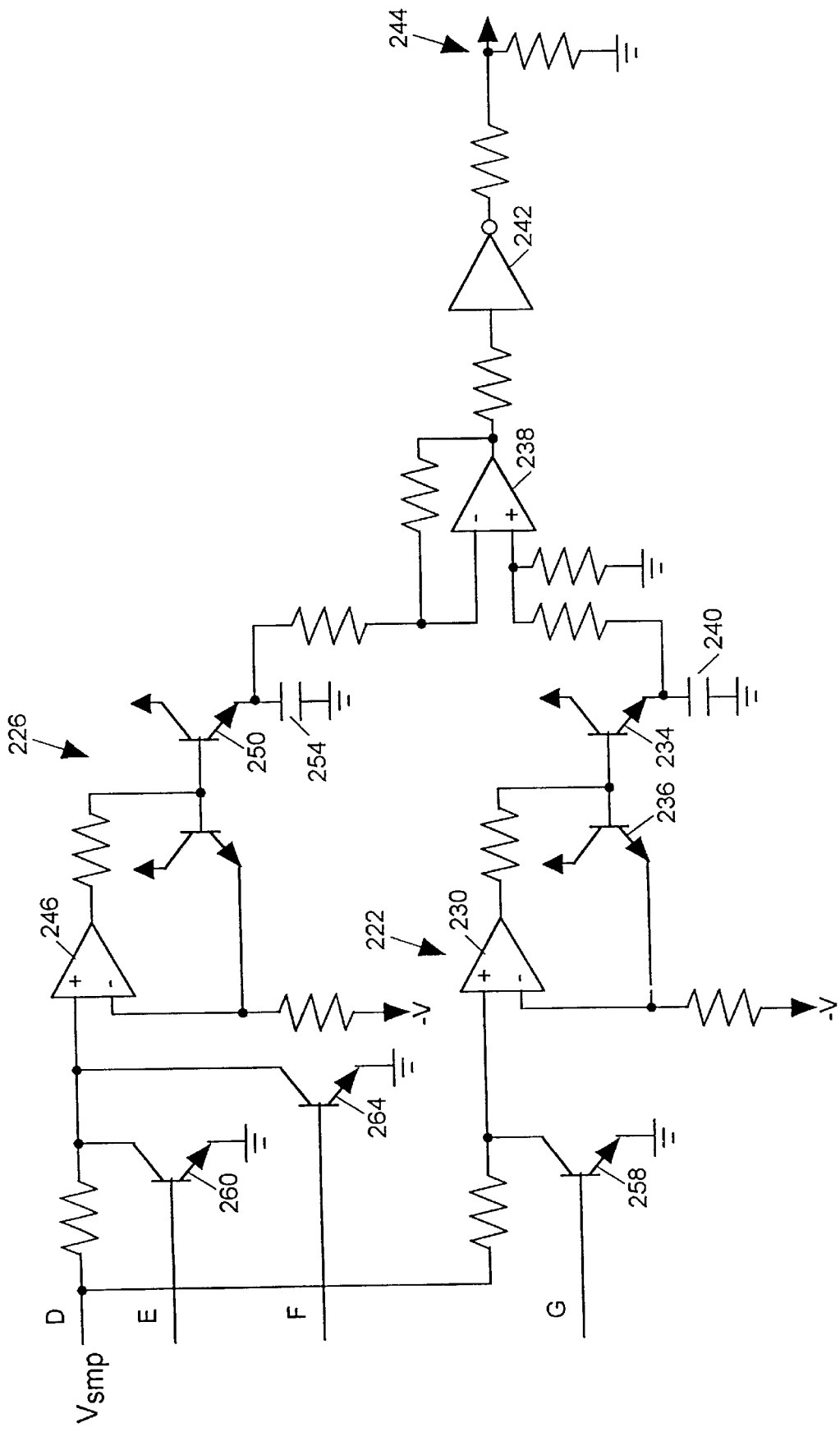

Turning now to FIGS. 8A and 8B, which illustrate one form of the control voltage generator, the output signal of the amplifier 124 is supplied to two paths. In the upper path, the signal is passed through a dc blocking (ac coupling) capacitor 152, a level shifter 154, and a buffer 156 to a ramp generator which is composed of a transistor 160, a capacitor 164 and a current source implemented by a resistor 168 connected between the collector of the transistor 160 and the positive supply rail. The signal at the input of the buffer 156 is a positively-shifted replica of the signal $V_{out}$. During a negative pulse of the signal $V_{aes}$, the signal $V_{smp}$ applied to the base of the transistor 160 is negative. Accordingly, the transistor 160 is non-conductive and the capacitor 164 charges through the resistor 168. During a positive pulse of the signal $V_{aes}$, the signal $V_{smp}$ is positive. The transistor 160 becomes conductive and the capacitor 164 discharges. Regardless of the clock frequency of the AES data, the peak voltage attained by the capacitor 164 during a negative pulse of the signal $V_{aes}$ is linearly proportional to the number of consecutive bit cells in the pulse: if the pulse is only one bit cell in duration (source bit 0), the voltage is τm', where m' v/s is the slope of the voltage waveform at the collector of the transistor 160 when the transistor is off; if the pulse is two bit cells (source bit 1), the voltage is 2τm'; and if the pulse is three bit cells (violation), the voltage is 3τm'.

Regardless of the clock frequency of the AES data, the maximum value of the peak voltage attained by the capacitor 164 is linearly proportional to the duration of the violation.

The voltage to which the capacitor 164 charges is applied to the non-inverting input of an amplifier 172 whose output is connected to a hold capacitor 176 through an emitter follower transistor 180. The output of the amplifier 172 is also connected to a second emitter follower transistor 184, which matches the transistor 180 and has its emitter connected to the inverting input of the amplifier 172. The amplifier 172 isolates the capacitor 164 from the transistors 180 and 184. The voltage at the base of the transistor 184 is one base-emitter drop above the voltage at the non-inverting input of the amplifier 172. If the voltage at the non-inverting input of the amplifier 172 increases above its previous maximum value, the amplifier 172 and the transistor 180 charge the capacitor 176 so that the voltage at the emitter of the transistor 180 follows the voltage at the non-inverting input of the amplifier 172, but if the voltage at the non-inverting input of the amplifier 172 decreases, the transistor 180 prevents the capacitor 176 from discharging. Consequently, the capacitor 176 stores the maximum value of the peak voltage attained by the capacitor 164. The amplifier 172, and the transistors 180 and 184 and the capacitor 176 thus form a peak hold circuit.

The voltage stored on the capacitor 176 is applied to a buffer 188. The output of the buffer 188 depends on the voltage stored on the capacitor 176 and is applied by way of a potential divider 192 to the inverting input of a first comparator 194 and by way of a potential divider 198 to the inverting input of a second comparator 202. Typically, the potential divider 192 sets a ratio of one-fourth and the potential divider 198 sets a ratio of one-twelfth.

In the lower path, the signal $V_{out}$ is passed through a dc blocking capacitor 206, a level shifter 208, and an inverter 210 to a second ramp generator which is composed of a transistor 212, a capacitor 214 and a current source implemented by a resistor 218 connected between the collector of the transistor 212 and the positive supply rail. The signal at the input of the inverter 210 is a negatively-shifted replica of the signal $V_{out}$. During a positive pulse of the signal $V_{aes}$, the signal applied to the base of the transistor 212 is negative. Accordingly, the transistor 212 is non-conductive and the capacitor 214 charges through the resistor 218. During a negative pulse of the signal $V_{aes}$, the signal applied to the base of the transistor 212 is positive. The transistor 212 becomes conductive and the capacitor 214 discharges. The capacitor 218 charges at the same rate regardless of the clock frequency of the AES data and regardless of the number of consecutive bit cells in the pulse. The rate of charge of the capacitor 218 is the same as the rate of charge of the capacitor 164.

The voltage on the capacitor 214 is applied to a buffer 220. The output of the buffer 220 depends on the voltage on the capacitor 214 and is applied to the non-inverting inputs of the comparators 194 and 202. In steady state operation, the output of the comparator 202 will go high after one-fourth of the first bit cell of a positive pulse of the signal $V_{aes}$ and the output of the comparator 194 will go high after three-fourths of the first bit cell of a positive pulse of the signal $V_{aes}$.

The two ramp generators are responsive to negative and positive pulses respectively in order to compensate for the delay of the buffer 188.

The output signal $V_{smp}$ of the buffer 156 is also applied to a leading edge sampler 222 and a trailing edge sampler 226. The leading edge sampler 222 includes a buffer 230 having its output connected through an emitter follower 234 to the non-inverting input of a differential amplifier 238. A storage capacitor 240 is connected between the emitter of the transistor 234 and ground. The circuit topology of the leading edge sampler 222 is similar to that of the peak hold circuit shown in FIG. 8A. Reference may be made to the description of the operation of the peak hold circuit for the mode of operation of the leading edge sampler, except as specifically addressed here.

The non-inverted output of the comparator 202 is connected to the base of a clamping transistor 258 whose collector is connected to the non-inverting input of the amplifier 230. When the transistor 258 is non-conductive, the action of the amplifier 230 and transistor 236 causes the potential at the emitter of the transistor 234 to follow the signal $V_{smp}$. The capacitor 240 charges to the voltage at the non-inverting input of the amplifier 230. When the transistor 258 is turned on, by the non-inverted output of the comparator 202 going high one-fourth way through the first bit cell of a positive pulse of the signal $V_{aes}$, the base of the transistor 234 goes low and the capacitor 240 stops charging. The capacitor 240 will discharge slowly because of the high resistance of its discharge path. When the transistor 258 is turned off again at the end of the positive pulse of the signal $V_{aes}$ by the non-inverted output of the comparator 202 going low, the base of the transistor 234 again follows the non-inverting input of the amplifier 230 (with one base-emitter drop). If the voltage at the non-inverting input of the amplifier 230 increases to a level above the emitter voltage of the transistor 234, the transistor 234 will turn on and the capacitor 240 will resume charging, following the non-inverting input of the amplifier 230. In the case of the positive pulse of the signal $V_{aes}$ being only one bit cell long, the output of the comparator 202 goes low at the end of that bit cell whereas if the pulse is two or three bit cells long, the output remains high until the end of the second (or third) bit cell. Thus, the capacitor 240 is charged to the voltage of the signal $V_{smp}$ one-fourth way through the first bit cell of each pulse, and is repeatedly refreshed on successive pulses.

The trailing edge sampler 226 is similar to the leading edge sampler 222, including a buffer 246, an emitter follower transistor 250 connected to the inverting input of the differential amplifier 238 and a storage capacitor 254 connected between the emitter of the transistor 250 and ground.

The non-inverted output of the comparator 194 is connected to the base of a clamping transistor 260 whose collector is connected to the non-inverting input of the amplifier 246. The inverted output of the comparator 202 is connected to a further clamping transistor 264 whose collector-emitter path is connected in parallel with the collector-emitter path of the transistor 260.

At the beginning of a positive pulse of the signal $V_{aes}$, the transistor 264 is on and the transistor 260 is off. Consequently, the transistor 250 is off and the capacitor 254 is not being charged. At τ/4 through the first bit cell, the transistor 264 turns off and the voltage at the emitter of the transistor 250 increases rapidly to $V_{smp}$. The voltage on the capacitor 254 initially follows the voltage at the non-inverting input of the amplifier 246. At the time 3τ/4 the transistor 260 becomes conductive and the non-inverting input of the amplifier 246 is pulled down. The capacitor 254 ceases charging, but it does not discharge immediately due to the high resistance of its discharge path. At the end of the positive pulse of the signal $V_{aes}$, the transistor 260 turns off but the transistor 264 turns on and so the transistor 250 remains nonconductive.

Using the transistor 264 to control the state of the transistor 250 prevents energy from the leading edge from being included in the trailing edge value. If the signal were over-equalized, so that the leading edge voltage of the signal $V_{smp}$ was higher than the trailing edge value, and the transistor 260 alone were used to control the transistor 250, the trailing edge value would be equal to the leading edge value and the desired correction would not be accomplished.

The output of the differential amplifier 238 is applied to an inverter 242 so that the signal will have the proper polarity. The inverter also integrates the signal to eliminate short term variations. The output signal of the integrator is then supplied to the control voltage input of the amplifier 124 through a potential divider 244 which brings the signal into the proper range.

It will be appreciated that the invention is not restricted to the particular embodiment that has been described, and that variations may be made therein without departing from the scope of the invention as defined in the appended claims and equivalents thereof.

What is claimed is:

1. A method of equalizing an electrical signal that is propagated over a path from a transmitting end of the path, at which a signal composed of pulses of uniform amplitude within a bit cell is impressed on the path, to a receiving end of the path, said method comprising the steps of:

applying the signal at the receiving end of the transmitting path to a frequency-dependent emphasizer and to a first port of a mixer, applying an output signal of the frequency-dependent emphasizer to a second port of the mixer, employing the mixer to combine the signals received at the first and second ports of the mixer in accordance with the amplitude of a mixer control signal to generate a mixer output signal, generating a control signal from the mixer output signal, the control signal having an amplitude dependent on the absolute value of the derivative of the amplitude of the output signal of the mixer during an interval that starts after the beginning of a bit cell and ends before the end of the bit cell, and applying the control signal to the mixer as the mixer control signal.

2. A method according to claim 1, wherein the step of generating the control signal includes:

generating a ramp signal which starts at the beginning of a first bit cell of a pulse and continues for a predetermined duration, comparing the ramp signal with at least first and second references values corresponding to a leading edge sampling time and a trailing edge sampling time respectively and generating a leading edge sampling pulse and a trailing edge sampling pulse, employing the leading edge sampling pulse to sample the mixer output signal and provide a leading edge sample, employing the trailing edge sampling pulse to sample the mixer output signal and provide a trailing edge sample, and subtracting the leading edge sample from the trailing edge sample.

3. A method according to claim 1, wherein the step of generating the control signal includes:

generating a first signal corresponding to the mixer output signal, generating a second signal corresponding to the mixer output signal delayed by an interval shorter than one bit cell, subtracting one of the first and second signals from the other of the first and second signals to generate a difference signal, and rectifying the difference signal.

* * * * *